US010013560B1

(12) United States Patent
Anderson et al.

(10) Patent No.: US 10,013,560 B1
(45) Date of Patent: *Jul. 3, 2018

(54) SECURELY EXCHANGING INFORMATION DURING APPLICATION STARTUP

(71) Applicant: International Business Machines Corporation, Armonk, NY (US)

(72) Inventors: Rayne Anderson, Charlotte, NC (US); Stephen S. Harding, Charlotte, NC (US); Alpeshkumar Patel, Warner Robins, GA (US); Jiafu Yu, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/479,952

(22) Filed: Apr. 5, 2017

(51) Int. Cl.
*G06F 21/57* (2013.01)
*G06F 9/445* (2018.01)
*H04L 29/06* (2006.01)
*G06F 21/62* (2013.01)

(52) U.S. Cl.
CPC ........ *G06F 21/572* (2013.01); *G06F 9/44505* (2013.01); *G06F 21/6209* (2013.01); *H04L 63/061* (2013.01); *H04L 63/18* (2013.01); *G06F 2221/032* (2013.01)

(58) Field of Classification Search
None
See application file for complete search history.

(56) References Cited

U.S. PATENT DOCUMENTS

| 7,543,145 | B2 | 6/2009 | Olson et al. |
| 9,141,647 | B2 | 9/2015 | Diaz et al. |
| 9,369,444 | B1 | 6/2016 | Feeser et al. |
| 2008/0168271 | A1 | 7/2008 | Sherburne et al. |
| 2014/0142982 | A1 | 5/2014 | Janssens |
| 2017/0041349 | A1 | 2/2017 | Ylonen |

FOREIGN PATENT DOCUMENTS

CN 103699848 A 4/2014

OTHER PUBLICATIONS

Author unknown, System and method for securely storing and retrieving data in configuration files, Oct. 5, 2010, IP.com No. IPCOM000200318D pp. 1, 3, 5-6, 8-9 (Year: 2010).*

(Continued)

*Primary Examiner* — Nadia Khoshnoodi
(74) *Attorney, Agent, or Firm* — Robert J. Shatto

(57) ABSTRACT

Provided is a method for securely exchanging information during application startup. A processor may send a request for a passphrase to one or more remote devices using a first out-of-band message. The processor may receive, from at least one of the remote devices, a response that includes the passphrase. The response may be a second out-of-band message. The processor may decrypt application startup data that is stored in a first configuration file for the application using the received passphrase. The application startup data may be necessary for the application to execute. The processor may then execute the application using the decrypted application startup data.

11 Claims, 7 Drawing Sheets

(56) References Cited

OTHER PUBLICATIONS

Wikipedia, "Two-man rule," https://en.wikipedia.org/wiki/Two-man_rule, printed Feb. 20, 2017, 5 pgs.
Mell et al., "The NIST Definition of Cloud Computing," Recommendations of the National Institute of Standards and Technology, U.S. Department of Commerce, Special Publication 800-145, Sep. 2011, 7 pgs.
Accelerated Examination Support Document, U.S. Appl. No. 15/839,279, signed Dec. 6, 2017, 24 pgs.
Anderson et al., "Securely Exchanging Information During Application Startup," U.S. Appl. No. 15/839,279, filed Dec. 12, 2017.
List of IBM Patents or Patent Applications Treated as Related, Dec. 12, 2017, 2 pgs.

* cited by examiner

SECURELY EXCHANGING INFORMATION DURING APPLICATION STARTUP

BACKGROUND

The present disclosure relates generally to the field of computing, and more particularly to securely exchanging information during application startup to enable decryption of configuration files.

Many applications, including operating systems, use configuration files to store the parameters and initial settings for the application. The configuration files are often read during the application startup process in order to prepare the application for use. The configuration files may also be periodically checked for changes during the execution of the application. These configuration files often contain sensitive information, such as passwords for various components.

SUMMARY

Embodiments of the present invention disclose a method, computer program product, and system for securely exchanging information during application startup. A processor may send a request for a passphrase to one or more remote devices. The request may be sent during a startup of an application. The request may be sent using a first out-of-band message. The processor may receive, from at least one of the remote devices, a response that includes the passphrase. The remote device may send the response using a second out-of-band message. The processor may decrypt application startup data that is stored in a first configuration file for the application using the received passphrase. The application startup data may be necessary for the application to execute. The processor may then execute the application using the decrypted application startup data.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
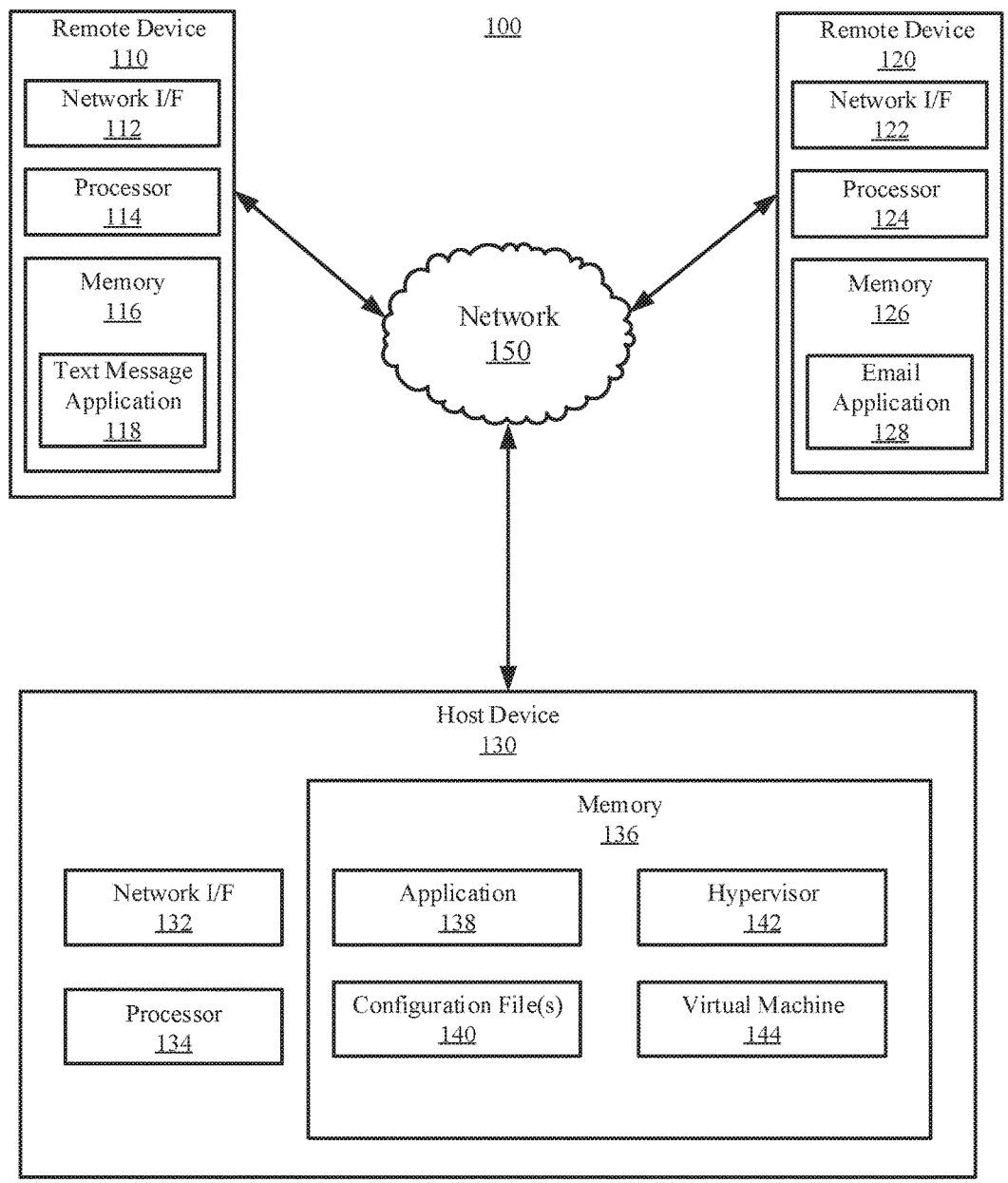
FIG. 1 illustrates a block diagram of an example computing environment in which illustrative embodiments of the present disclosure may be implemented.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to securely exchanging information during application startup using out-of-band communications to enable decryption of configuration files. While the present disclosure is not necessarily limited to such applications, various aspects of the disclosure may be appreciated through a discussion of various examples using this context.

Most applications using configuration properties will contain sensitive information, such as passwords for various components or the passphrase used to secure sensitive information during the startup. If an administrator does not want to store the sensitive information in the configuration file then the application may require providing the sensitive information on the command line/window. A problem with this approach is that the administrator has to be present to start up the application. However, for production systems where the applications need to be started as services without an administrator present, typically the sensitive information has to be stored in the configuration properties file.

There are several ways to achieve application startup without the user being present. The sensitive information can be stored on a hardware security module (HSM) for example. As another example, the sensitive information can be stored on remote server and then retrieved when needed. The known solutions may be costly in HSM case, or may shift the management of application security to different location or level.

Embodiments of the present disclosure include a method for starting up an application that has sensitive information by securely exchanging information during the startup. A computer system may attempt to start up an application that has sensitive information in its startup data, which is stored in an encrypted configuration file. The startup data, including the sensitive information, may be required for the application to properly execute. For example, the startup data may include information such as initial settings, parameters, functions, and passwords (e.g., for databases) that are necessary for the application to run. The sensitive information in the startup data, such as the passwords, may be encrypted. As used herein, the application startup data may refer to the sensitive information in a configuration file, such as database passwords that a user may wish to encrypt.

In some embodiments, the computer system may send a request for a passphrase necessary to decrypt the sensitive information to one or more administers using an out-of-band communication channel. As used herein, an "out-of-band communication" is a communication sent over a communication channel and not entered directly into the command prompt of the computer system. For example, out-of-band communications include emails and text messages. As another example, the out-of-band communications can be communications sent to an app of the administrator's smart phone.

The computer system may receive, from at least one remote device (e.g., the smart phone), the requested passphrase. The requested passphrase may be sent by the remote device over the same out-of-band communication channel that the computer system used to send the request. The computer system may then use the passphrase to decrypt the sensitive information. Once the sensitive information is decrypted, the computer system may execute the application.

Turning now to the figures, FIG. 1 illustrates a block diagram of an example computing environment 100 in which illustrative embodiments of the present disclosure may be implemented. In some embodiments, the computing environment 100 may include two remote devices 110 and 120 and a host device 130.

Consistent with various embodiments, the host device 130 and the remote devices 110 and 120 may be computer systems. For example, in some embodiments the remote devices 110 and 120 are mobile telephones, and the host device is a server that hosts a hypervisor 140 and virtual machine 142 with a guest operating system. The remote devices 110 and 120 and the host device 130 may include one or more processors 114, 124, and 134 and one or more memories 116, 126, and 136, respectively.

The remote devices 110 and 120 and the host device 130 may be configured to communicate with each other through an internal or external network interface 112, 122, and 132. The network interfaces 112, 122, and 132 may be, e.g., modems or network interface cards. For example, the network interfaces 112, 122, and 132 may enable the host device 130 and the remote devices 110 and 120 to communicate with each other using an out-of-band communication channel, such as through text message or email.

The remote devices 110 and 120 and/or the host device 130 may be equipped with a display or monitor. Additionally, the remote devices 110 and 120 and/or the host device 130 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the remote devices 110 and 120 and/or the host device 130 may be servers, desktops, laptops, or hand-held devices.

The remote devices 110 and 120 and the host device 130 may be distant from each other and communicate over a network 150. In some embodiments, the host device 130 may be a central hub from which remote devices 110 and 120 can establish a communication connection, such as in a client-server networking model. Alternatively, the host device 120 and remote devices 110 and 120 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the remote devices 110 and 120 and the host device 130 may be local to each other, and communicate via any appropriate local communication medium. For example, the remote devices 110 and 120 and the host device 130 may communicate using a local area network (LAN), one or more hardwire connections, a wireless link or router, or an intranet. In some embodiments, the remote devices 110 and 120 and the host device 130 may be communicatively coupled using a combination of one or more networks and/or one or more local connections. For example, the first remote device 110 may be hardwired to the host device 130 (e.g., connected with an Ethernet cable) while the second remote device 120 may communicate with the host device using the network 150 (e.g., over the Internet).

In some embodiments, the network 150 may be a telecommunication network. The telecommunication network may include one or more cellular communication towers, which may be a fixed-location transceiver that wirelessly communicates directly with a mobile communication terminal (e.g., remote devices 110 and 120). Furthermore, the network may include one or more wireless communication links to enable out-of-band communications (e.g., text messages or emails) between the remote devices 110 and 120 and the host device 130. The wireless communications links may include, for example, shortwave, high frequency, ultra-high frequency, microwave, wireless fidelity (Wi-Fi), Bluetooth technology, global system for mobile communications (GSM), code division multiple access (CDMA), second-generation (2G), third-generation (3G), fourth-generation (4G), or any other wireless communication technology or standard to establish a wireless communications link.

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150.

In some embodiments, the remote devices 110 and 120 may enable administrators to receive requests for passphrases from, and submit responses to, the host device 130 using an out-of-band communication in order to enable the host device to execute an application (e.g., application 136). For example, the remote devices 110 and 120 may include a text message application 118 and an email application 128, respectively, and a user interface (UI). The text message application 118 and an email application 128 may be in the form of a web browser or any other suitable software module, and the UI may be any type of interface (e.g., command line prompts, menu screens, graphical user interfaces). The UI may allow a user to interact with the remote devices 110 and 120 to review, using the text message application 118 and/or the email application 128, requests for a passphrase sent by the host device 130. Likewise, the UI may allow a user to interact with the remote devices 110 and 120 to send, using the text message application 118 and an email application 128, the passphrases to the host device 130 using an out-of-band communication channel.

In some embodiments, the host device 130 may include a hypervisor 142, a virtual machine 144, an application 138, and one or more configuration files 140. The hypervisor 142 may host the virtual machine 144. The virtual machine may include a guest operating system, and may execute the application 138. In other embodiments, the operating system may be installed directly on the host device 130, and the host device 130 may not include a hypervisor or a virtual machine.

The application 138 may have corresponding configuration file(s) 140. The configuration file(s) 140 may configure the parameters and initial settings for the application 138. As discussed in more detail herein, some (or parts of) the configuration file(s) 140 may be encrypted. In some embodiments, the host device 130 may not include a hypervisor 142 or a virtual machine 144. Instead, the operating system and application 138 may be installed directly on the host device 130. In some embodiments, the configuration file(s) 140 may correspond to the operating system (e.g., a guest operating system) instead of, or in addition to, the application 138.

While FIG. 1 illustrates a computing environment 100 with a single host device 130 and two remote devices 110 and 120, suitable computing environments for implementing embodiments of this disclosure may include any number of remote devices and host devices. The various models, modules, systems, and components illustrated in FIG. 1 may exist, if at all, across a plurality of host devices and remote devices. For example, some embodiments may include two host devices. The two host devices may be communicatively coupled using any suitable communications connection (e.g., using a WAN, a LAN, a wired connection, an intranet, or the Internet).

It is noted that FIG. 1 is intended to depict the representative major components of an exemplary computing environment 100. In some embodiments, however, individual components may have greater or lesser complexity than as represented in FIG. 1, components other than or in addition to those shown in FIG. 1 may be present, and the number, type, and configuration of such components may vary.

Figure 2:
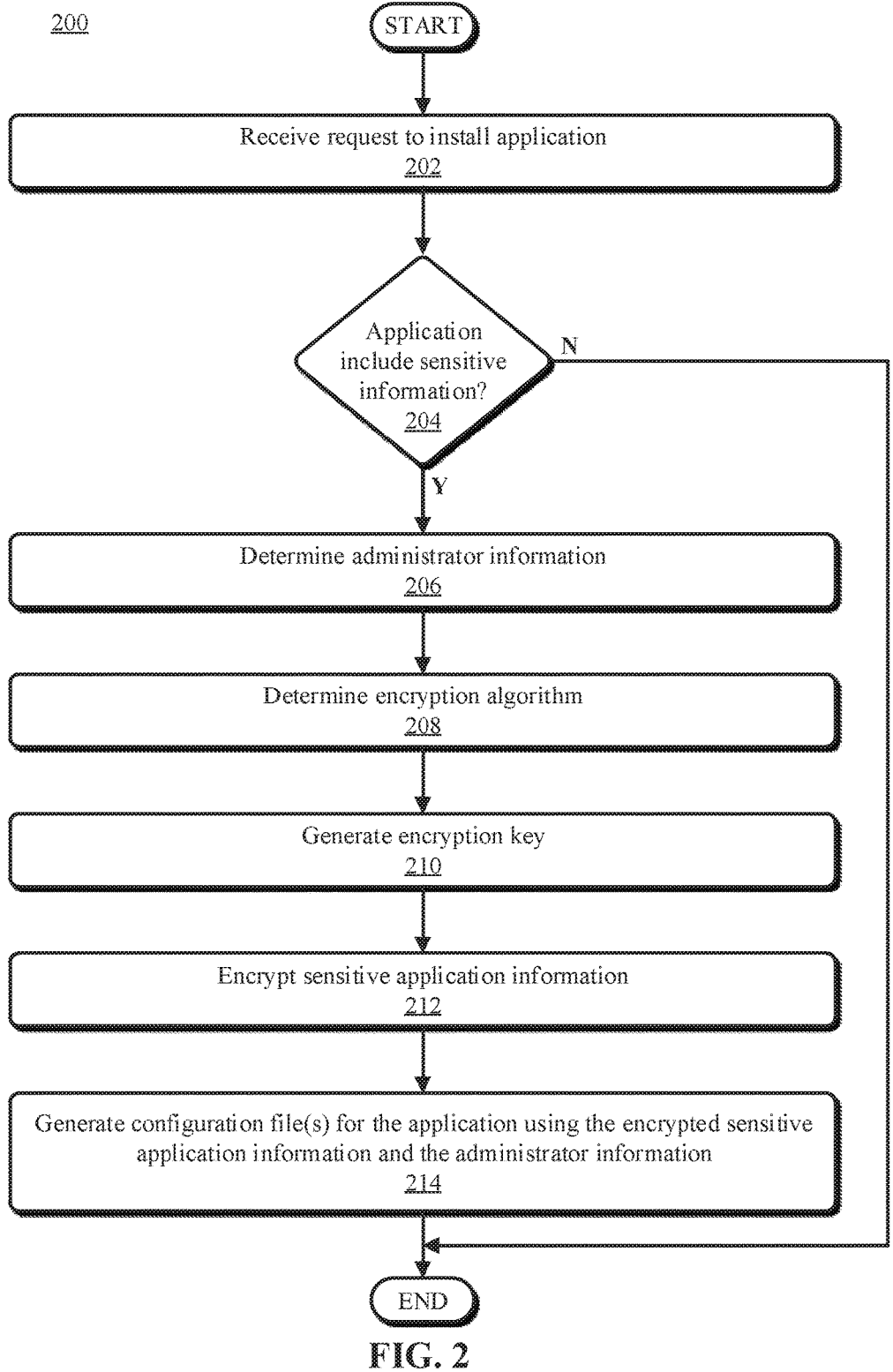
FIG. 2 illustrates a flowchart of an example method for setting up an encrypted application configuration file, in accordance with embodiments of the present disclosure.

Referring now to FIG. 2, illustrated is a flowchart of an example method 200 for setting up an encrypted application configuration file, in accordance with embodiments of the present disclosure. In some embodiments, the method 200 may be performed automatically by a computer system (e.g., by host device 110 described in reference to FIG. 1). In some embodiments, one or more operations of the method 200 may be performed by the computer system in response to user input. The method 200 may begin at operation 202, where a host device 130 may receive a request to install an application 138.

After receiving a request to install an application 138 at operation 202, the host device 130 may determine whether the application 138 is going to include sensitive information (e.g., passwords) in a configuration file 140 for the application 138 at decision block 204. In some embodiments, the host device 130 may automatically determine whether the configuration file(s) 140 are going to include sensitive information. In other embodiments, a user may identify (e.g., input into the host device 130) the application 138 as including sensitive information. This may be done during the installation (e.g., by selecting an installation option). In some embodiments, the user and/or host device 130 may determine that an already installed application's 138 configuration file(s) 140 contain sensitive information.

If the host device 130 determines that the application 138 does not include sensitive information in its configuration file 140 at decision block 204, the method 200 may end. Otherwise, the host device 130 may determine administrator information for the one or more administrators who will be permitted to prompt or allow the application startup at operation 206. The administrator information may include out-of-band contact information for the administrator. For example, the administrator information may include an email address and a mobile telephone number. The administrator information may additional include other information, such as the administrator's name, a group ID that the administrator belongs to, a preferred contact method, and one or more time periods when the administrator is available. The host device 130 may use this information when sending passphrase requests to the remote devices 110 and 120 during an application startup, as described in more detail in reference to FIG. 3.

In some embodiments, a user may manually input the administrator information into the computer system at operation 206. In other embodiments, the host device 130 may retrieve the administrator information from another file. While operation 206 is shown as being performed prior to determining the encryption algorithm, it can be done at any time.

At operation 208, the host device 130 may determine an encryption algorithm to secure the sensitive information with. The host device 130 may utilize any encryption algorithm type to secure the sensitive information. For example, in some embodiments the host device 130 may use a symmetric encryption algorithm such as the Advanced Encryption Standard (AES) algorithm. In other embodiments, the host device 130 may use an asymmetric encryption algorithm, also known as a public key algorithm, such as the RSA algorithm.

In some embodiments, the host device 130 may prompt a user (e.g., during installation) to select the encryption algorithm at operation 208. The host device 130 may provide a list of available algorithms from which the user can select a particular algorithm for the application 138. In some embodiments, the host device 130 may automatically select an algorithm for the application 138 at operation 208.

After determining an encryption algorithm at operation 208, the host device 130 may determine (e.g., generate) one or more encryption keys for the application 138 at operation 210. The number of encryption keys generated by the host device 130 may depend on the type of encryption selected at operation 208. For example, if symmetric key encryption is chosen at operation 208, a single encryption key may be generated for the application 138.

In some embodiments, the host device 130 may prompt a user to input one or more passphrases. The host device 130 may then use the one or more passphrases and a key derivation function to generate the one or more encryption keys. For example, if the user selects an asymmetric encryption algorithm and inputs a particular passphrase, the host device 130 may generate a key pair (e.g., a public key and a private key) using the inputted passphrase and the key derivation function. In other embodiments, the user may input the encryption key directly at operation 210 instead of having the host device 130 generate it.

After generating the encryption key at operation 210, the host device 130 may encrypt the sensitive application information using the encryption key and the encryption algorithm at operation 212. In some embodiments, only the information that was determined to be sensitive information may be encrypted. For example, the host device 130 may encrypt one or more passwords that are going to be stored in the configuration file 140, but all other parameters may remain unencrypted. In some embodiments, all of the initial settings and parameters for the program, except those necessary to load the application 138 to a point where it can send out-of-band communication requests to the remote devices 110 and 120, such as the administrator information, may be encrypted.

After encrypting the sensitive application information at operation 212, the host device 130 may generate configuration file(s) 140 for the application 138 using the encrypted sensitive application information and the administrator information at operation 214. The configuration file(s) 140 may contain the parameters and initial settings for the application 138. For example, the configuration file(s) 140 may include the encrypted sensitive application information (e.g., passwords), as well as other parameters necessary for the application 138 to startup and run. The generated configuration file(s) 140 may also include the administrator information, as well as copies of the key derivation function, a decryption algorithm, and the encryption key (particularly if asymmetric encryption is performed).

Additionally, the generated configuration file(s) 140 may include initialization information for the application 138. The initialization information is the information necessary for the application 138 to startup to a point where it is capable of sending out-of-band communications to the one or more remote devices 110 and 120 requesting the passphrase. For example, the initialization information may include sufficient parameters and settings to allow the application 138 to send emails or text messages. Furthermore, the initialization information may enable the application 138 to receive the responses from the remote devices 110 and 120, parse the responses to extract the passphrase, concatenate or otherwise combine multiple passphrases (in embodiments where multiple passphrases are required), and decrypt the sensitive application information. Additionally, the initialization information may allow the application 138 to perform a subset of its normal functions, such as those that do not require the sensitive information that has been encrypted.

In some embodiments, the host device 130 may generate a single configuration file 140 for the application 138. The configuration file 140 may include an unencrypted portion and an encrypted portion. The unencrypted portion may include the initialization data, the administrator information, and the decryption algorithm, while the encrypted portion may include the encrypted sensitive information. Any remaining information, such as the parameters, settings, key derivation function, and encryption key, may be in the unencrypted portion or the encrypted portion.

In some embodiments, the host device 130 may generate multiple configuration files 140 for the application 138. For example, the host device 130 may generate a first configuration file for the unencrypted information and a second configuration file for the encrypted information. As discussed in more detail in reference to FIG. 3, upon application startup, the application 138 (or operating system executing the application 138) may use information in the first configuration file to generate and send requests for passphrases to remote devices 110 and 120. Once the passphrases are received, the application 138 may use the received passphrases to decrypt the second configuration file, which may then be used to finish starting the application 138 up and executing the application 138. After generating the configuration file(s) 140 for the application 138 at operation 214, the method 200 may end.

While the configuration file(s) 140 are described as being generated after the sensitive application information is encrypted, in some embodiments the operations may be reversed or performed simultaneously. For example, in some embodiments the configuration file(s) 140 may be generated and then sensitive application information contained in the configuration file(s) 140 may be encrypted. In some embodiments, such as those where symmetric key encryption is used, the encryption key may be deleted from the computer system after the sensitive data is encrypted.

In some embodiments, one or more of the operations of the method 200 described herein may be performed in alternative orders or may not be performed at all; furthermore, multiple operations may occur at the same time or as an internal part of a larger process. For example, operations 204-214 may be performed in response to something other than an install request, such as a user identifying an installed application as containing sensitive information. In these embodiments, the configuration file(s) 140 for the application may already exist, and the method may instead modify the existing configuration file(s) 140 in order to encrypt the sensitive information.

Figure 3:
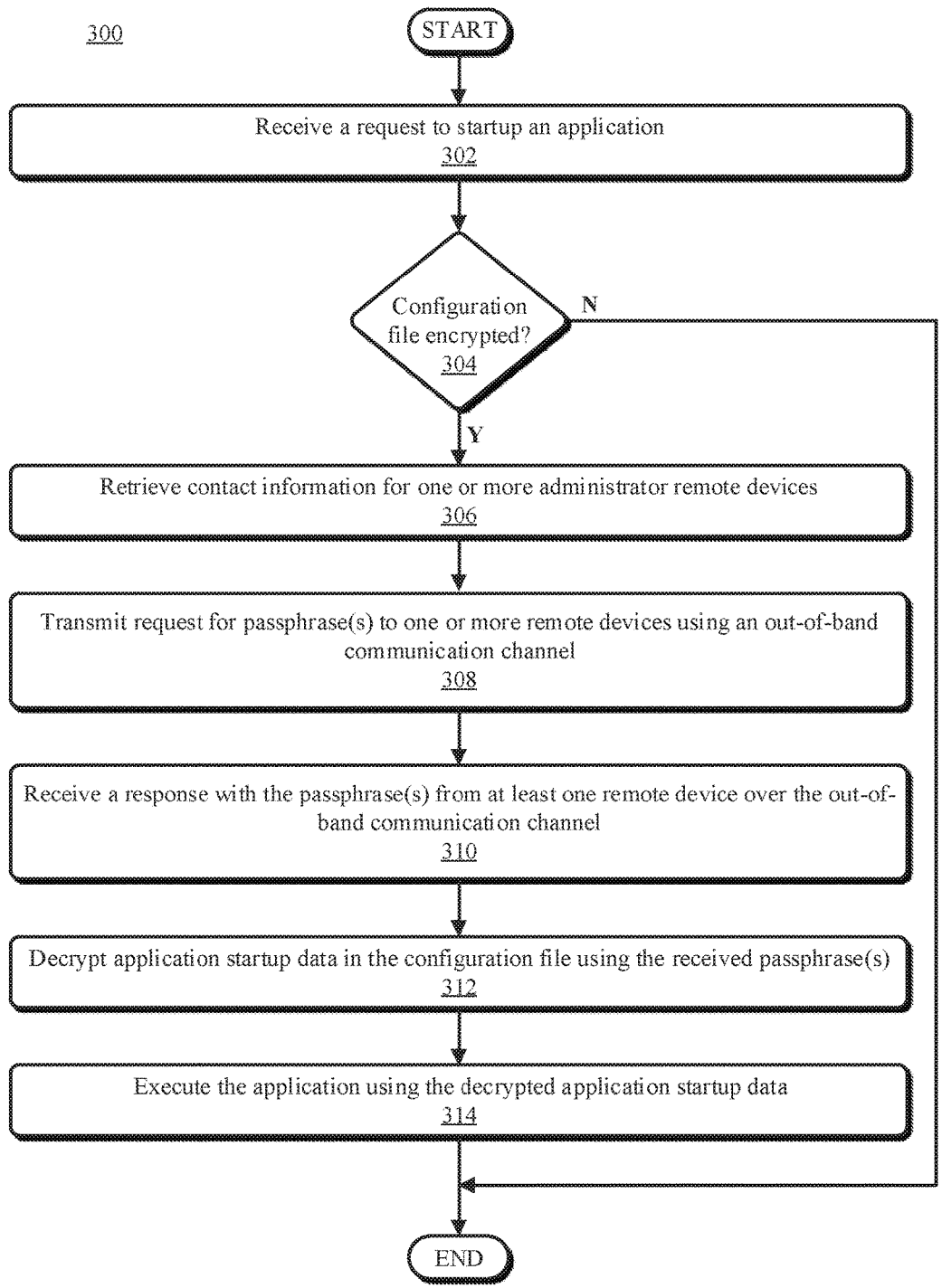
FIG. 3 illustrates a flowchart of an example method for decrypting and executing an application that has an encrypted configuration file, in accordance with embodiments of the present disclosure.

Referring now to FIG. 3, illustrated is a flowchart of an example method 300 for decrypting and executing an application that has an encrypted configuration file, in accordance with embodiments of the present disclosure. In some embodiments, the method 300 may be performed automatically by a computer system (e.g., by host device 130 described in reference to FIG. 1). In some embodiments, one or more operations of the method 300 may be performed by the computer system in response to user input. The method 300 may begin at operation 302, where a host device 130 may receive a request to start an application 138.

In some embodiments, the application startup process may be automatically initiated by the operating system, such as after the host device 130 reboots. In other embodiments, a user or other computer application may attempt to startup the application 138. The host device 130 may then determine whether the configuration file 140 for the application 138 is encrypted at decision block 304.

In some embodiments, the host device 130 may identify a flag (e.g., in memory or in a file associated with the application 138) that indicates that the application 138 includes sensitive information in its configuration file 140 that has been encrypted. This may cause the host device 130 to load a second configuration file that includes the initialization information for the application 138. In some embodiments, the host device 130 may not determine whether the configuration file 140 is encrypted at all. Instead, it may be configured to load the initialization information upon all startups of the application 138, without checking whether the configuration file 140 is encrypted or not.

If the host device 130 determines that the configuration file 140 for the application 138 is not encrypted at decision block 304, the method 300 may end. Otherwise, the host device 130 may retrieve contact information for one or more remote devices 110 and 120 (e.g., an administrator's smart phone) at operation 306. As described herein, the contact information may be saved as unencrypted data in a configuration file 140. The host device 130 may retrieve the contact information from the configuration file 140, and determine which remote devices 110 and 120 to send out-of-band requests for a passphrase to. In some embodiments, the contact information may be stored elsewhere in the host device 130 or in a remote system, and the host device 130 may retrieve the contact information from this other location. This may be particularly advantageous if numerous applications in the host device 130 all have the same set of administrators, as updating the contact information (e.g., adding or removing an administrator or remote device 110 or 120, changing a phone number, etc.) can be done by editing a single file, rather than the configuration files for the numerous applications.

After retrieving the contact information at operation 306, the host device 130 may transmit a request for a passphrase to one or more remote devices 110 and 120 using an out-of-band communication channel (e.g., text message) at operation 308. The host device 130 may first determine which remote devices 110 and 120 to send requests to, as well as which out-of-band communication channels to use. In some embodiments, the host device 130 may have default settings that it uses. For example, the host device 130 may default to sending messages to all remote devices 110 and 120 (or randomly to ½ of the remote devices) using text message.

In other embodiments, the host device 130 may use information contained in the configuration file 140 to determine which remote devices 110 and 120 to send requests to. For example, the administrator contact information may include a time period during which they are available to respond to messages, as well as a preferred contact method. In some embodiments, the administrators may belong to distinct groups having different passphrases. Each passphrase may be required to decrypt the sensitive information. Accordingly, the host device 130 may be unable to decrypt the sensitive information without getting at least one response from a member of each group. In these embodiments, the host device 130 may ensure that at least one member of each group (e.g., at least one remote device in each group) receives a request for their passphrase.

After sending the requests for a passphrase at operation 308, the host device 130 may receive a response from at least one remote device 110 and 120 at operation 310. In some embodiments, the response may be received on the same out-of-band communication channel on which the request was sent. For example, the host device 130 may have sent the request using a text message, and may receive a text message with the passphrase as the response. In other embodiments, different communication channels may be used for the requests and the responses. In some embodiments, the request may indicate the out-of-band communication channel that the response is required to use. For example, the host device 130 may transmit a text message to the remote device 110 and 120, but it may require that the remote device 110 and 120 respond via email.

If, after a predetermined period of time, the host device 130 has not received a response with the passphrase, or has received insufficient responses, it may retransmit the request. In embodiments where it has received some, but not enough, responses, it may only resend the request to remote devices 110 and 120 who have not yet responded. For example, if the host device 130 sends requests to remote devices belonging to three distinct groups, and receives responses for two of the groups, it may send follow-up requests only to remote devices in the third group (i.e., the group for which it does not have a passphrase). In some embodiments, such as those where it sent the original requests to a subset of the entire group of remote devices, it may send the subsequent requests to the other remote devices (e.g., the ones that did not receive the first request).

The transmitted requests and responses may be securing using any suitable security protocol for the out-of-band communication channel used. In some embodiments, a plug-in application may be installed on the host device 130 and/or the remote device(s) 110 and 120 to secure the exchange of the request and passphrase. In some embodiments, in response to receiving the request, a user may access the application's 138 UI (e.g., remote log in through a website or app, or through a command console) to provide the passphrase. After receiving the passphrase(s) at operation 310, the host device 130 may decrypt the application startup data (e.g., the sensitive information) in the configuration file 140 at operation 312. The host device 130 may use the received passphrase(s) and a decryption algorithm (which may be in the configuration file 140, elsewhere on the host device 130, retrieved from a remote device 110 or 120, etc.) to decrypt the configuration file 140.

In some embodiments, the passphrase(s) may act as the decryption key. In other embodiments, the passphrase(s) may be converted into the decryption key using a key derivation function, such a Password-Based Key Derivation Function 2 (PBKDF2), or other key stretching techniques. For example, if the remote device 110 or 120 responds with the passphrase "password1," the host device 130 may convert the passphrase into the key "6A04192817C134BF1EF0073974." The host device 130 may then use the decryption key, along with the decryption algorithm, to decrypt the configuration file 140.

In some embodiments, such as those using a (t,n)-threshold encryption scheme, the host device 130 may need to combine multiple passphrases to generate the decryption key. Numerous ways to combine multiple passphrases are known to persons of ordinary skill in the art, and the present disclosure should not be limited to any particular method. By way of example, the passphrases can be concatenated in a specific order (e.g., group-1's passphrase+group-2's passphrase). The combined passphrase can then be used as the decryption key, or converted into the decryption key using a key derivation function, as described herein.

After the host device 130 decrypts the application startup data at operation 312, the host device 130 may execute the application 138 using the decrypted application startup data at operation 314, and the method 300 may end.

For example, the host device 130 may automatically reboot after a shutdown event, such as the installation of an operating system update. Upon rebooting, the host device 130 may attempt to startup an application 138. The application 138 may utilize secured databases, and as such may store passwords, which a user may want to be encrypted, to access the databases in its configuration file 140. Accordingly, the configuration file 140 (or portions thereof) may have been encrypted when the application 138 was installed. The host device 130 may load unencrypted initialization information for the application 138 from a second configuration file.

After loading the initialization information, the application 138 may send requests for a passphrase to a plurality of remote devices 110 and 120 (e.g., to nine remote devices). The requests may be sent using an out-of-band communication channel, such as via text message. The nine remote devices may be grouped into three distinct groups: group-1, group-2, and group-3. Each group may have its own passphrase. The requests sent to the remote devices of group-1 and group-2 may request that at least one remote device from each of those groups respond via a first out-of-band communication channel (e.g., text message) with their passphrase. The requests sent to the remote devices of group-3 may request that they respond via a second out-of-band communication channel (e.g., email), and may provide them with an email address. The requests may be secured using respective security protocols for text message and email.

The host device 130 may then wait for responses from each group. If, after a predetermined period of time, the host device 130 has not received a response from a remote device in, for example, group-3, the host device 130 may send a second request. The second request may be sent to a different remote device in group-3 than the first request. When the responses are received, the host device 130 may verify the responses come from the appropriate remote devices (e.g., by comparing the email address or phone number the responses came from to those found in the administrator contact information).

After verifying that the responses came from an approved remote device, the host device 130 may combine each of the passphrases. For example, the three passphrases may be combined by concatenating them such that the combined passphrase is PW1∥PW2∥PW3, where PW1-3 are the passphrases from the first, second, and third groups, respectively. The host device 130 may then use a key derivation function to derive the decryption key using the combined passphrase. For example, if the first passphrase is "Password1," the second is "Password2," and the third is "Password3," the combined passphrase may be "Password1Password2Password3." This combined passphrase may then be converted into a decryption key using a key derivation function.

After the host device 130 generates the decryption key, it may decrypt one or more configuration files 140 (or portions thereof) of the application 138. The host device 130 may then load the parameters from the unencrypted configuration file 140, and execute the application 138.

Figure 4:
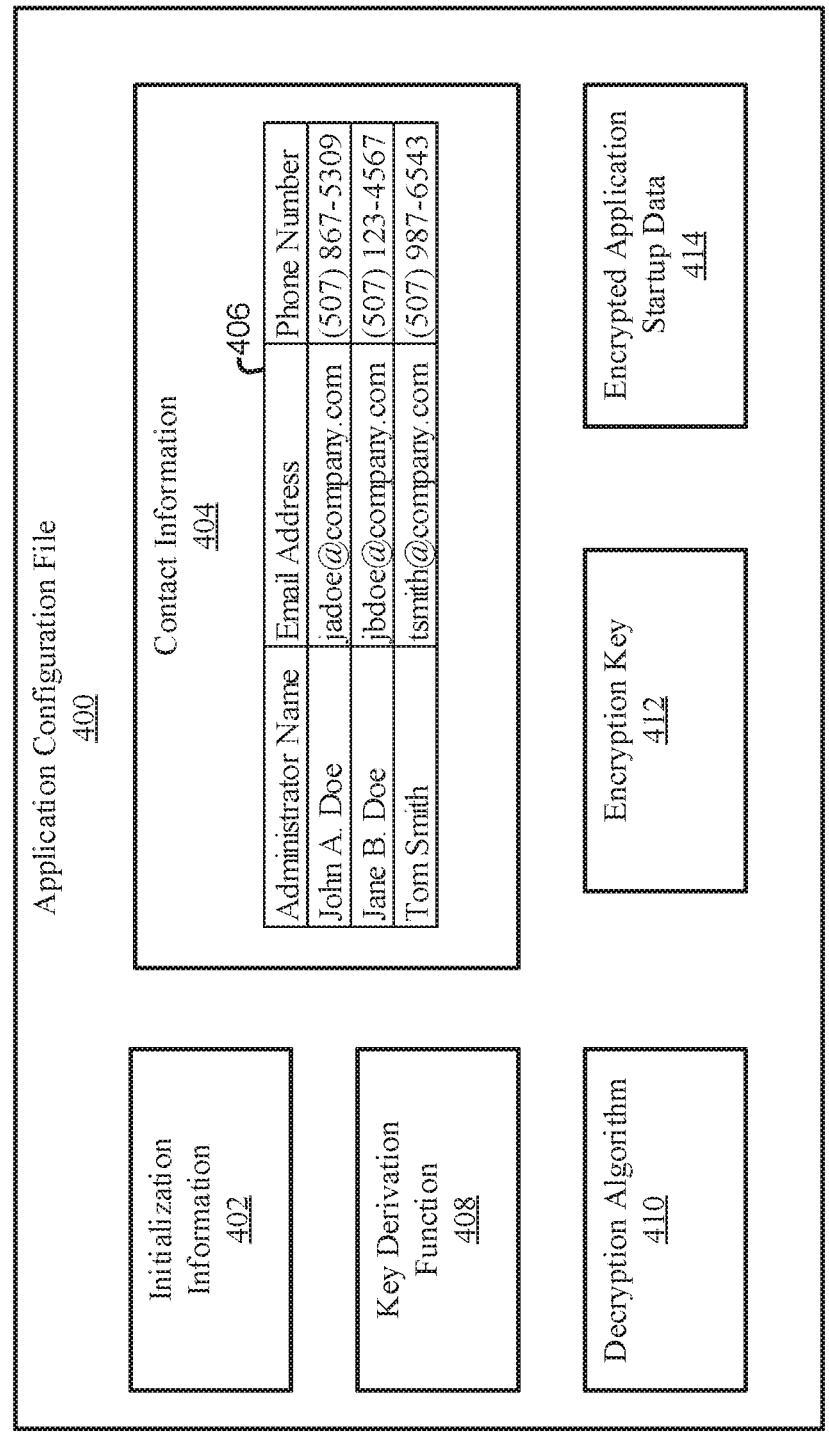
FIG. 4 illustrates an example configuration file for an application, in accordance with embodiments of the present disclosure.

Referring now to FIG. 4, illustrated is an example configuration file 400 for an application, in accordance with embodiments of the present disclosure. The configuration file 400 may include initialization information 402, contact information 404, a key derivation function 408, a decryption algorithm 410, an encryption key 412, and encrypted application startup data 414.

As described herein, the initialization information 402 may be information (e.g., parameters, initial settings, functions, etc.) that enable the application to send requests for passphrases to remote devices, receive the responses, and decrypt the application startup data 414. The application startup data 414 may include information (e.g., parameters, initial settings, functions, passwords, etc.) that enables the application to execute, but is sensitive. For example, if the application uses a database that stores protected information (e.g., employee or health information), the database may be password protected. The application may store the necessary password for that password in the encrypted application startup data 414. The key derivation function 408 may be used by the application, or an operating system or hypervisor executing the application, to generate a decryption key from the received responses, and in light of the decryption algorithm 410. The encryption key 412 may be used by the application to encrypt the application startup data when it no longer needs to be decrypted, or in the event that the application startup data is modified. For example, part of the shutdown process for the application may include encrypting the application startup data. This may not be necessary if the decrypted application startup data is stored in memory, but not saved in persistent memory or in the configuration file.

The contact information 404 may include one or more tables (e.g., table 406) that include contact information for the administrators who have a passphrase necessary to decrypt the application startup data 414. For example, the table may include the administrators name, their email address, and their phone number, so that the computer system can send them an out-of-band request (e.g., over text message or email) for the passphrase. As discussed herein, the contact information 404 may include other information, such as which groups each administrator belongs to, times when they are available, and their preferred contact method.

The various components (e.g., initialization information 402, key derivation function 408, etc.) shown in the application configuration file 400 are illustrative of one or more embodiments of the present disclosure. However, in some embodiments, the components may exists in two or more configuration files, or not at all. For example, in some embodiments, the encryption key 412 may not be stored anywhere on the computer. This may be particularly important when symmetric encryption is used to encrypt the application startup data, as the same key can also be used to decrypt the application startup data. FIG. 4 is illustrative of one or more embodiments, and should not be construed as limiting.

Figure 5:
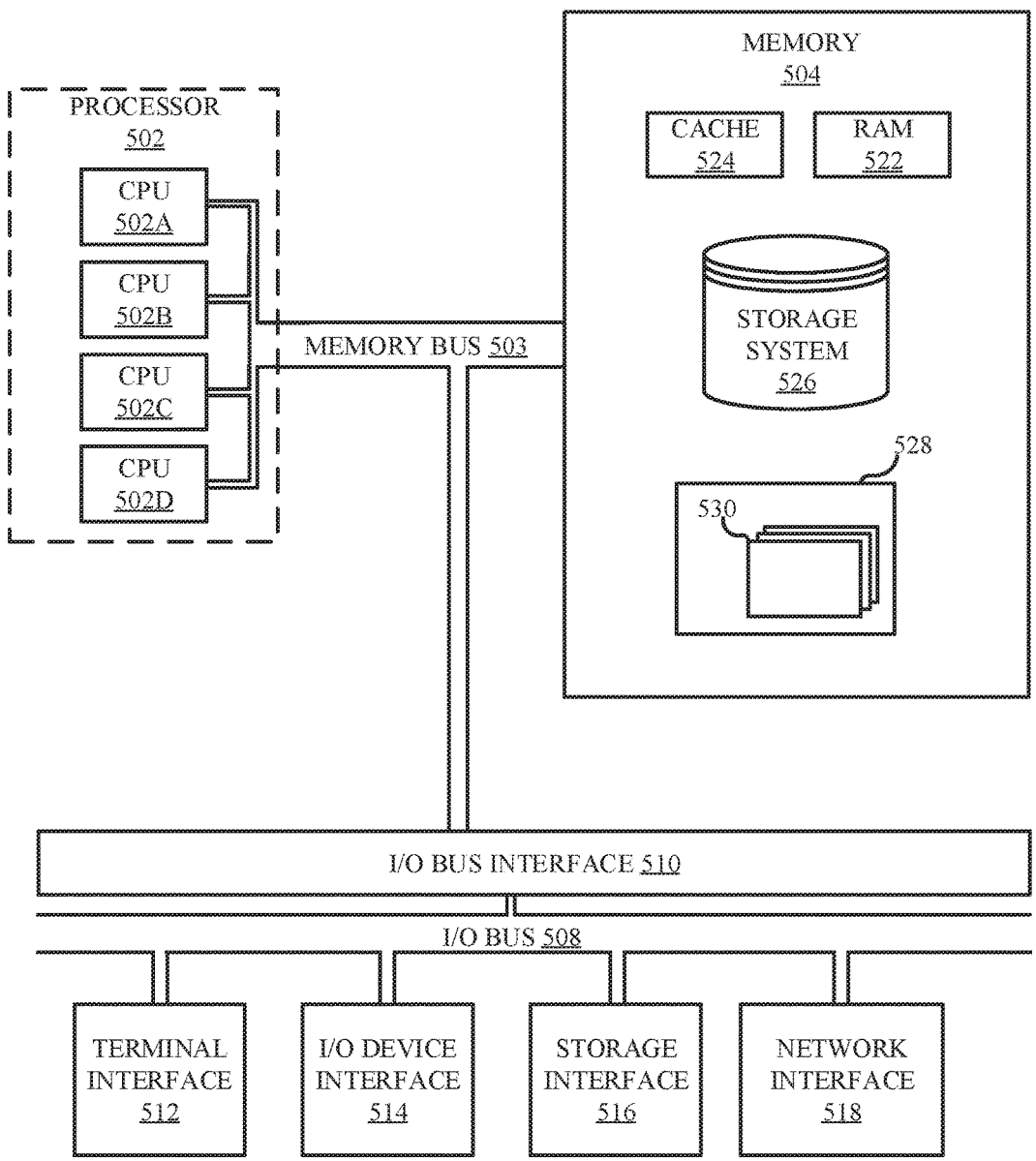
FIG. 5 illustrates a high-level block diagram of an example computer system that may be used in implementing one or more of the methods, tools, and modules, and any related functions, described herein, in accordance with embodiments of the present disclosure.

Referring now to FIG. 5, shown is a high-level block diagram of an example computer system 501 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 501 may comprise one or more CPUs 502, a memory subsystem 504, a terminal interface 512, a storage interface 516, an I/O (Input/Output) device interface 514, and a network interface 518, all of which may be communicatively coupled, directly or indirectly, for inter-component communication via a memory bus 503, an I/O bus 508, and an I/O bus interface unit 510.

The computer system 501 may contain one or more general-purpose programmable central processing units (CPUs) 502A, 502B, 502C, and 502D, herein generically referred to as the CPU 502. In some embodiments, the computer system 501 may contain multiple processors typical of a relatively large system; however, in other embodiments the computer system 501 may alternatively be a single CPU system. Each CPU 502 may execute instructions stored in the memory subsystem 504 and may include one or more levels of on-board cache.

System memory 504 may include computer system readable media in the form of volatile memory, such as random access memory (RAM) 522 or cache memory 524. Computer system 501 may further include other removable/non-removable, volatile/non-volatile computer system storage media. By way of example only, storage system 526 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 504 can include flash memory, e.g., a flash memory stick drive or a flash drive. Memory devices can be connected to memory bus 503 by one or more data media interfaces. The memory 504 may include at least one program product having a set (e.g., at least one) of program modules that are configured to carry out the functions of various embodiments.

One or more programs/utilities 528, each having at least one set of program modules 530 may be stored in memory 504. The programs/utilities 528 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 530 generally perform the functions or methodologies of various embodiments.

Although the memory bus 503 is shown in FIG. 5 as a single bus structure providing a direct communication path among the CPUs 502, the memory subsystem 504, and the I/O bus interface 510, the memory bus 503 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 510 and the I/O bus 508 are shown as single respective units, the computer system 501 may, in some embodiments, contain multiple I/O bus interface units 510, multiple I/O buses 508, or both. Further, while multiple I/O interface units are shown, which separate the I/O bus 508 from various communications paths running to the various I/O devices, in other embodiments some or all of the I/O devices may be connected directly to one or more system I/O buses.

In some embodiments, the computer system 501 may be a multi-user mainframe computer system, a single-user system, or a server computer or similar device that has little or no direct user interface, but receives requests from other computer systems (clients). Further, in some embodiments, the computer system 501 may be implemented as a desktop computer, portable computer, laptop or notebook computer, tablet computer, pocket computer, telephone, smart phone, network switches or routers, or any other appropriate type of electronic device.

It is noted that FIG. 5 is intended to depict the representative major components of an exemplary computer system 501. In some embodiments, however, individual components may have greater or lesser complexity than as represented in FIG. 5, components other than or in addition to those shown in FIG. 5 may be present, and the number, type, and configuration of such components may vary.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
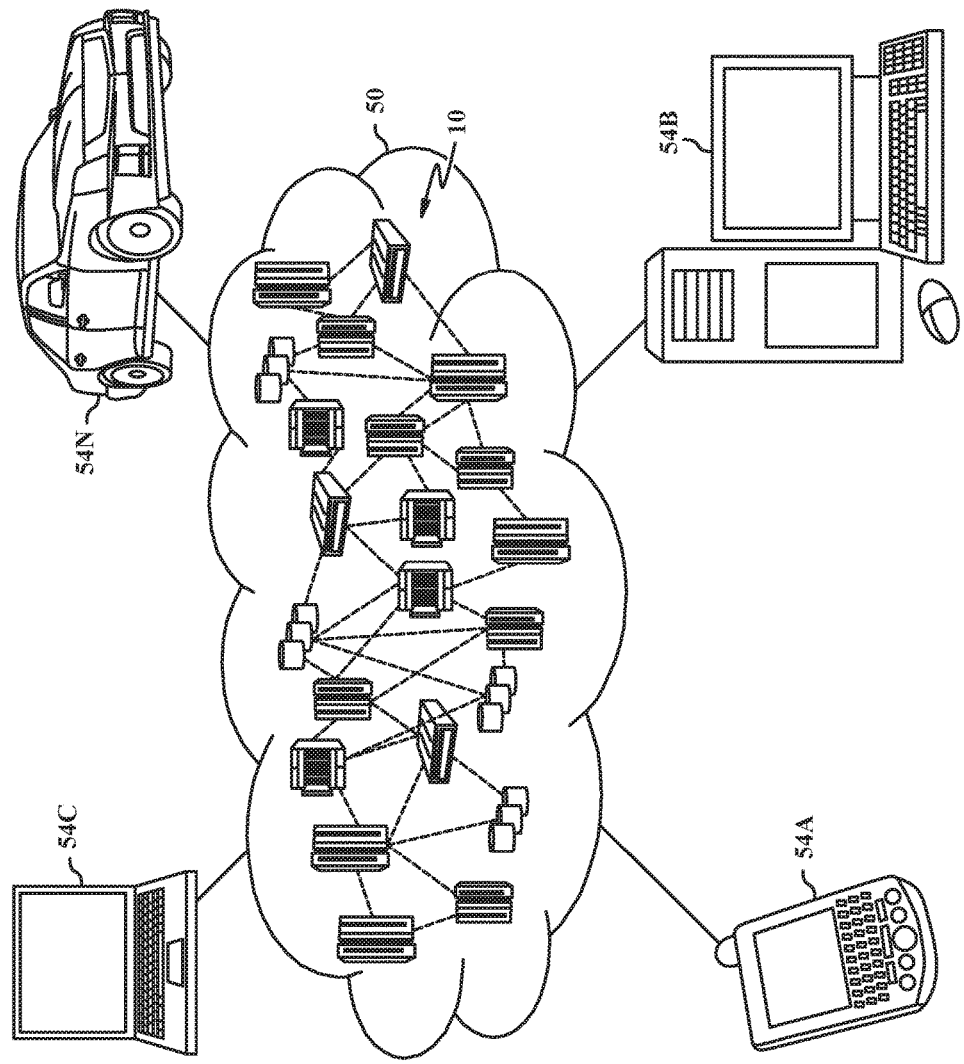
FIG. 6 depicts a cloud computing environment, in accordance with embodiments of the present disclosure.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
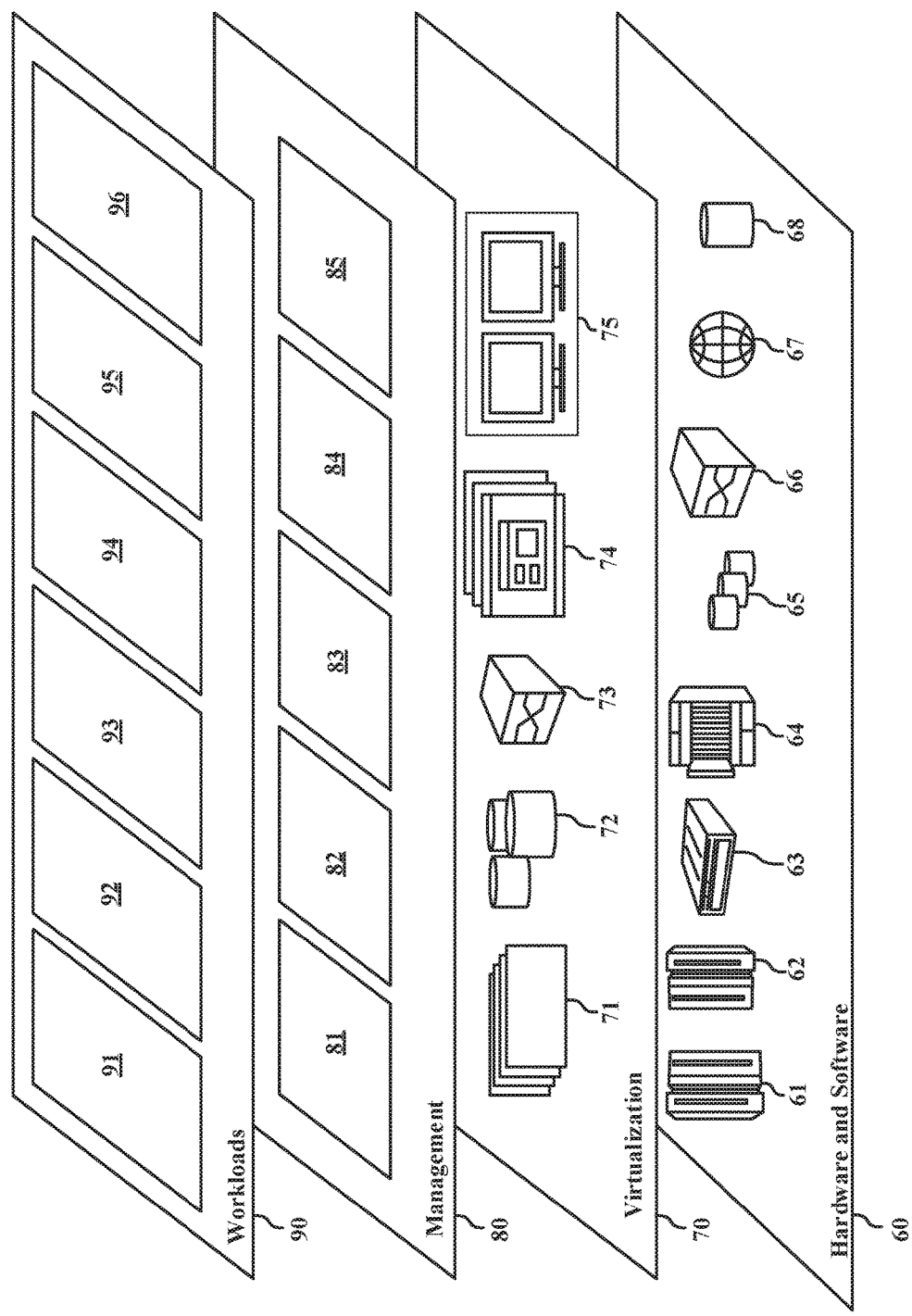
FIG. 7 depicts abstraction model layers, in accordance with embodiments of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktops 96.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method comprising:
   storing, in a configuration file for an application, an encryption algorithm, contact information for one or more remote devices and an encryption key;
   encrypting, using the encryption key and the encryption algorithm, the application startup data;
   sending, by a processor during a startup of the application and to the one or more remote devices using the contact information for the one or more remote devices, a request for a passphrase using a first out-of-band message;
   receiving, from at least one of the one or more remote devices, a response with the passphrase, the response being a second out-of-band message wherein the second out-of-band message uses the same out-of-band communication channel as the first out-of-band message, the out-of-band communication channel being selected from a group consisting of SMS text message MMS text message and email;

decrypting, using the received passphrase, application startup data stored in a first configuration file for the application, wherein the application startup data is necessary for the application to execute, wherein the decrypting the application startup data includes:
  generating, using a key derivation function and the passphrase, a decryption key; and
  decrypting using the generated decryption key and the encryption algorithm the application startup data; and executing the application using the decrypted application startup data.

2. The method of claim 1, wherein the application startup data is encrypted using a (t,n)-threshold scheme, and wherein the request for the passphrase is sent to two or more remote devices.

3. The method of claim 2, wherein the two or more remote devices are clustered into at least two groups, each group having a separate passphrase, and wherein decrypting the application startup data requires a passphrase from a remote device in each group.

4. A system comprising:
  a memory;
  a processor communicatively coupled to the memory, the processor being configured to perform a method comprising:
    storing, in a configuration file for an application, an encryption algorithm, contact information for one or more remote devices and an encryption key;
    encrypting, using the encryption key and the encryption algorithm, the application startup data;
    sending, during a startup of the application and to the one or more remote devices using the contact information for the one or more remote devices, a request for a passphrase using a first out-of-band message;
    receiving, from at least one of the one or more remote devices, a response with the passphrase, the response being a second out-of-band message, wherein the second out-of-band message uses the same out-of-band communication channel as the first out-of-band message, the out-of-band communication channel being selected from a group consisting of SMS text message, MMS text message, and email;
    decrypting, using the received passphrase, application startup data stored in a first configuration file for the application, wherein the application startup data is necessary for the application to execute wherein the decrypting the application startup data includes:
      generating, using a key derivation function and the passphrase, a decryption key; and
      decrypting, using the generated decryption key and the encryption algorithm, the application startup data; and
    executing the application using the decrypted application startup data.

5. The system of claim 4, wherein the encryption algorithm, the contact information for the one or more remote devices, and the encryption key are stored in a second configuration file that is distinct from the first configuration file, and wherein the second configuration file further includes initialization information for the application, the initialization information including parameters and initial settings that enable the application to send the request for the passphrase.

6. The system of claim 5, wherein the second configuration file includes the key derivation function.

7. The system of claim 4, wherein the application startup data is encrypted using a (t,n)-threshold scheme, wherein the one or more remote devices include at least two remote devices that are clustered into at least two groups, each group having a separate passphrase, and wherein the sending the request for the passphrase comprises:
  identifying, using the first configuration file, a first remote device and a second remote device, the first remote device belonging to a first group and the second remote device belonging to a second group;
  sending a first request for a first passphrase to the first remote device; and
  sending a second request for a second passphrase to the second remote device.

8. The system of claim 7, wherein the receiving the response to the passphrase includes receiving a first response having the first passphrase from the first remote device and a second response having the second passphrase from the second remote device.

9. A computer program product comprising a computer readable storage medium having program instructions embodied therewith, the program instructions executable by a processor to cause the processor to perform a method comprising:
  storing, in a configuration file for an application, an encryption algorithm, contact information for one or more remote devices, and an encryption key;
  encrypting using the encryption key and the encryption algorithm the application startup data;
  sending during a startup of the application and to the one or more remote devices using the contact information for the one or more remote devices a request for a passphrase using a first out-of-band message;
  receiving from at least one of the one or more remote devices a response with the passphrase the response being a second out-of-band message wherein the second out-of-band message uses the same out-of-band communication channel as the first out-of-band message the out-of-band communication channel being selected from a group consisting of SMS text message, MMS text message, and email;
  decrypting using the received passphrase application startup data stored in a first configuration file for the application, wherein the application startup data is necessary for the application to execute wherein the decrypting the application startup data includes:
    generating, using a key derivation function and the passphrase, a decryption key; and
    decrypting, using the generated decryption key and the encryption algorithm, the application startup data; and
  executing the application using the decrypted application startup data.

10. The computer program product of claim 9, wherein the encryption algorithm, the contact information for the one or more remote devices, and the key derivation function are stored in a second configuration file that is distinct from the first configuration file.

11. The computer program product of claim 9, wherein the application startup data is encrypted using a (t,n)-threshold scheme, and wherein the one or more remote devices include remote devices that are clustered into at least two groups, each group having a separate passphrase.

* * * * *